Patented Feb. 22, 1927.

1,618,482

UNITED STATES PATENT OFFICE.

STANLEY D. SHIPLEY AND GUY C. GIVEN, OF STAMFORD, CONNECTICUT, ASSIGNORS TO ATLAS POWDER COMPANY, OF WILMINGTON, DELAWARE, A CORPORATION OF DELAWARE.

LACQUER AND LACQUER ENAMEL.

No Drawing. Application filed April 18, 1925. Serial No. 24,259.

This invention relates to lacquers and lacquer enamels; and it comprises as a composition of matter, a coating composition containing nitrocellulose, with or without other coating bodies, such as resins, held in solution by a solvent comprising a propyl ether of ethylene glycol, the propyl group being most advantageously isopropyl; and it further comprises a method of making lacquers, varnishes and enamels wherein nitrocellulose is dissolved in a propyl ether of ethylene glycol; all as more fully hereinafter set forth and as claimed.

Nitrocellulose forms the basis of very many different varnishes, lacquers and enamels, being brought into solution for this purpose by a wide variety of solvents. Practical experience has shown that the properties of the varnish depend very much upon the particular solvent employed. Sometimes, thin films are desired and relatively weak solutions are used, say, not over 5 ounces of nitrocellulose per gallon; while at times, very much heavier films are wanted and strong solutions are used, say, up to 20 ounces per gallon. Exceptionally, as high as 40 to 60 ounces are used. In these solutions, the viscosity or flowability, the rate of drying, the properties of the final film, etc., depend upon the particular solvents used. In most cases, it is customary to use in connection with the solvent a diluent "non-solvent," such as benzene, toluene, xylene, gasolene, etc. This addition has various functions in the composition and in particular is useful in lowering the cost of the finished product. Various alcohols are sometimes used as diluents—ethyl, methyl, butyl, amyl, etc. These additions often promote homogeneity. Together with pyroxylin in the composition, there are frequently used many other materials; some being coating materials and some not. All sorts of resins are used, both natural and artificial, such as kauri, ester gum (glycerin resin ester), damar, shellac, etc.

For opaque varnishes, various ordinary pigments are often admixed, such as zinc oxid, lithopone, titanium oxid, etc., etc. For one purpose or another, "latent solvents," such as camphor or triphenyl phosphate, are often added.

In a prior Patent, No. 1,533,616, April 14, 1925, we have described and claimed compositions utilizing the solvent properties of ethyl glycol; the mono-ethyl ether derivative of ethylene glycol. This material is not only an excellent solvent for nitrocellulose, even dissolving grades not readily soluble in other solvents, but it makes solutions of excellent technical properties. These solutions will withstand dilution to a high extent with hydrocarbons without material loss of solvent power. Good compositions may be made containing as little as 1 part of ethyl glycol to 3 parts of benzene.

We have found that for many purposes, the propyl ethers derived from ethylene glycol are even more applicable. These propyl ethers may be either the ether obtained by replacing one hydrogen of a hydroxyl of ethylene glycol by the normal propyl group or that obtained by similarly replacing hydrogen by an isopropyl group. Either has distinct advantages, but for most purposes we find the body containing isopropyl the better. These bodies, which may be called propyl glycol, as compared with ethyl glycol, have somewhat less solvent power for nitrocellulose but an even better miscibility with hydrocarbon "non-solvents," such as benzene, toluene, xylene, and gasolene, than the ordinary nitrocellulose solvents of approximately the same boiling point. The viscosity of the nitrocellulose solutions is somewhat different from that of solutions formed with the aid of ethyl glycol and the flowing properties are different. The propyl glycol gives a film which is particularly tough and resistant; in fact, on drying, films may be obtained with its aid which are of a character that can only be obtained otherwise with the aid of such adventitious bodies as castor oil. The propyl glycols are, furthermore, excellent solvents for the various resins and are also miscible with the drying oils; a fact which gives them utility with various lacquers and enamels containing not only nitrocellulose but also various natural and artificial resins. In these compositions, linseed oil, soya bean oil, blown fish oils, etc., may be readily incorporated. In fact, with the aid of propyl glycol, nitrocellulose can be incorporated, in greater or less amount, into many of the ordinary paints or varnishes. Propyl glycol, being less miscible with water than methyl and ethyl glycols, has certain advantages over these products. We regard propyl glycol as highly advantageous in making composite lacquers, enamels and coatings where the nitrocellulose is only one coating component, and may be merely a minor component.

In a specific embodiment of our invention making an easily flowing, slow drying varnish of good leveling qualities, 1 part by weight of nitrocellulose may be dissolved in about 7 parts by weight of a mixture of solvents; this mixture comprising propyl glycol and a hydrocarbon "non-solvent" in the proportion of 2:3. As the hydrocarbon diluent may be used benzene, toluene, xylene and gasolene in admixture, in about equal proportions, with perhaps a little more toluene than benzene. However, the particular hydrocarbons used and the particular ratio depend somewhat upon the specific use of the varnish to be made. With the mixture of propyl glycol and hydrocarbons may be further admixed some alcohol, this being either butyl alcohol or denatured alcohol. Where the alcohols are used, they may form about ¼ of the compound solvent. With this composition may be blended any suitable amount of any suitable resin used for coating purposes. For many purposes, 5 parts of any suitable resin may be used. For an enamel or opaque varnish, a suitable amount of any suitable pigment may be ground into lacquer produced as described. For many purposes, about 2 parts of zinc oxid for each part of nitrocellulose gives a good composition. A little castor oil or a little camphor or both may be added for specific purposes. One of the great advantages of the propyl glycol is its freedom from offensive odor. Where odors are not objectionable, a certain amount of the ordinary nitrocellulose solvents, such as ethyl acetate, methyl acetate, butyl acetate or amyl acetate, may be used to replace part of the propyl glycol. In this mixture, the propyl glycol prevents precipitation of nitrocellulose by the hydrocarbon non-solvents; something which is apt to occur where the various acetates are the main solvents.

A composition of propyl glycol and hydrocarbon non-solvent, such as benzene, etc., is of special utility as a thinner for modifying the properties of nitrocellulose and compound varnishes. Or a similar mixture of propyl glycol and denatured ethyl alcohol or butyl alcohol or both may be used as a diluent or thinner. Amyl alcohol may be used in connection with propyl glycol in the same way.

What we claim is:—

1. A coating composition comprising nitrocellulose, a resin, a propyl ether of ethylene glycol constituting a solvent for both the nitrocellulose and resin, and a drying oil.

2. A coating composition comprising nitrocellulose, a resin, a propyl ether of ethylene glycol constituting a solvent for both the nitrocellulose and resin and a vegetable drying oil.

3. A coating composition comprising nitrocellulose, a resin, a propyl ether of ethylene glycol, as a solvent for the nitrocellulose and resin, and a pigment.

4. A film comprising nitrocellulose, a resin, a propyl ether of ethylene glycol, as a solvent for the nitrocellulose and resin, and a pigment miscible with said glycol.

5. A coating composition comprising nitrocellulose, a resin, isopropyl glycol as a solvent for both the nitrocellulose and resin.

6. A coating composition comprising nitrocellulose, a resin, isopropyl glycol as a solvent for both the nitrocellulose and resin, a pigment miscible with said glycol.

7. A coating composition comprising nitrocellulose, a resin, a propyl ether of ethylene glycol as a solvent for the nitrocellulose, a pigment, and a vegetable drying oil.

8. A coating composition comprising nitrocellulose, a resin, a propyl ether of ethylene glycol, as a solvent for both the nitrocellulose and resin, and a vegetable drying oil.

In testimony whereof, we have hereunto affixed our signatures.

STANLEY D. SHIPLEY.
GUY C. GIVEN.